(12) United States Patent
Takuno et al.

(10) Patent No.: US 6,206,159 B1
(45) Date of Patent: Mar. 27, 2001

(54) DRIVING TORQUE TRANSMISSION CONTROL APPARATUS USED IN AN AUTOMOTIVE VEHICLE

(75) Inventors: Hiroshi Takuno, Anjo; Mikiharu Oyabu, Kariya; Akihiko Ikeda, Aichi-ken, all of (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/443,348

(22) Filed: Nov. 19, 1999

(30) Foreign Application Priority Data

Nov. 29, 1998 (JP) .................................................. 10-330780

(51) Int. Cl.$^7$ .............................. F16D 27/00; F16D 27/10
(52) U.S. Cl. ........................ 192/35; 192/84.7; 192/84.91; 192/84.96; 192/30 V; 192/110 B; 192/115
(58) Field of Search ........................ 192/35, 84.7, 84.91, 192/84.93, 84.96, 93 A, 30 V, 103 F, 110 B, 112 C, 115; 384/536

(56) References Cited

U.S. PATENT DOCUMENTS

| 1,746,365 | 2/1930 | Schunemann . |
|---|---|---|
| 2,887,200 | 5/1959 | Mergen et al. . |
| 3,645,083 | 2/1972 | Lohring et al. . |
| 3,998,290 | 12/1976 | Sivers et al. . |
| 4,430,066 | 2/1984 | Benassi . |
| 4,682,676 | 7/1987 | Murata . |
| 6,109,408 | * 8/2000 | Ikeda et al. ............................. 192/35 |

FOREIGN PATENT DOCUMENTS

| 383 092 | 12/1964 | (CH) . |
|---|---|---|
| 2 215 754 | 10/1972 | (DE) . |
| 36 12 189 | 10/1987 | (DE) . |
| 1 217 736 | 5/1960 | (FR) . |
| 7-190094 | 7/1995 | (JP) . |
| 10-213164 | 8/1998 | (JP) . |

OTHER PUBLICATIONS

Patent Abstracts of Japan, vol. 1998, No. 6, Apr. 30, 1998, JP 10 052130, Feb. 24, 1998.

* cited by examiner

Primary Examiner—Charles A Marmor
Assistant Examiner—Saúl Rodríguez
(74) Attorney, Agent, or Firm—Oblon, Spivak, McClelland, Maier & Neustadt, P.C.

(57) ABSTRACT

A driving torque transmission control apparatus that is rotatably supported onto a vehicle body through a support bearing supported by a bearing holding device including an absorber and a bearing holding member, and that is serially disposed between driving force transmission axles. The apparatus further includes a first rotating member and a second rotating member rotatably connected around a common axis relatively with each other, to electro-magnetically control a driving torque transmitted from one of driving force transmission axles to the other thereof. A frictional engage section is provided between the first and second rotating members, to transmit from one of the first and second rotating members to the other thereof. Between the first and second rotating members, there is provided an annular electro-magnet to control a transmission torque of the frictional engage section. Further, an engage member provided on a support bearing to be engaged with the electromagnet to prevent rotation of the electromagnet with the first and second rotating members.

3 Claims, 7 Drawing Sheets

DRIVING TORQUE TRANSMISSION CONTROL APPARATUS USED IN AN AUTOMOTIVE VEHICLE

BACKGROUND OF THE INVENTION

1. Field of the Invention

The present invention relates to a driving torque transmission control apparatus, more particularly, relates to such an apparatus serially between driving force transmission axles to electromechanically control its driving force.

2. Description of the Related Art

Conventionally, it is suggested such an electromagnetically operated clutch apparatus that is serially disposed relative to a propeller shaft to select from a two-wheels driving status to a four-wheels driving status or to control a driving force distribution ratio between front wheels and rear wheels in the four-wheels driving operation Namely, the electro-magnetically operated clutch apparatus is serially disposed between driving force transmission axles to control a driving force transmitted from one of that driving force transmission axles to the other thereof, as described in U.S. patent application Ser. No. 09/014,627 filed on Jan. 28, 1999 by the same Applicant, for example.

In the electromagnetically operated clutch apparatus disclosed above, a bottomed cylindrical first rotating member rotating with one of the driving force transmission axles is relatively rotatably connected around a same center axis with a second rotating member rotating with the other thereof under a case of being disposed in the first rotating member. Between the first and second rotating members, here is provided a frictional engage section to transmit a driving torque from one of the first and second rotating members to the other thereof Further, an electromagnet is rotatably provided relative to the first and second rotating members to control a transmission torque of the frictional engage section. With this configuration, when an exciting current is supplied to the electromagnet through a lead wire, the torque corresponding to an amount of the exciting current is transmitted from one of the first and second rotating members to the other thereof.

However, there is a possibility that a sufficient durability cannot be obtained in the conventional clutch apparatus as described above. It is necessary such that the electromagnet is connected with a non-rotating member for connection of the lead wire with the electromagnet to prevent from its rotation with the first and second rotating members, for example. In such a case, when providing a connection mechanism between a vehicle body or a portion fixed thereto and the electromagnet, a vibration of the vehicle body is transmitted to the electro-magnet, so that the aforementioned clutch apparatus may be decreased in its durability. At an opening portion of the bottomed cylindrical first rotating member, there are farther formed annular clearance inside of the electro-magnet and outside thereof, so that it may be suggested to secure a mask member for covering the annular clearances to the electro-magnet. However, it cannot sufficiently be prevented such an incursion of alien substances by the mask member, whereby the durability may be deteriorated by the incursion. Further, it may be suggested to provide a ring-shaped seal member acceptable for relative rotation in order to seal the annular clearance formed inside of the electromagnet and outside thereof at an opening portion of the bottomed cylindrical first rotating member. In the annular clearance formed outside of the electromagnet, a circumferential speed and the seal member respectively become large in its relative and diameter particularly. Therefore, it has a disadvantage that the durability may. be sufficiently obtained and the seal member and the like becomes high in its cost.

SUMMARY OF THE INVENTION

Accordingly, an object of the present invention, to solve the above-described disadvantages, is to provide a driving force transmission control apparatus used in an automotive vehicle that has sufficient durability against vibration from a vehicle body and against incursion of alien substances.

Briefly, according to the present invention, a driving torque transmission control apparatus that is rotatably supported onto a vehicle body through a support bearing supported by a bearing holding device including an absorber and a bearing holding member, and that is serially disposed between driving force transmission axles. The apparatus further includes a first rotating member and a second rotating member rotatably connected around a common axis relatively with each other, to electro-magnetically control a driving torque transmitted from one of driving force transmission axles to the other thereof. A frictional engage section is provided between the first and second rotating members, to transmit from one of the first and second rotating members to the other thereof Between the first and second rotating members, there is provided an annular electromagnet to control a transmission torque of the frictional engage section. Further, an engage member provided on a support bearing to be engaged with the electromagnet to prevent rotation of the electromagnet with the first and second rotating members.

In the apparatus as constructed above, since the electromagnet is engaged with the engage member provided on the bearing holding member of the bearing holding device to prevent its rotation of the electromagnet, mechanical vibrations from the vehicle body is passed through the absorber to the engage member and the electromagnet. However, the mechanical vibration from the vehicle body to the electromagnet and/or the apparatus can be sufficiently restrained by the absorber, so that a durability of the apparatus can be improved and it can be restrained such noise and vibrations through the vehicle body to a passenger cabin generated when the electro-magnet is contacted with a peripheral connection mechanism.

According to the present invention, an assemble of the driving force transmission axles to the vehicle body can be facilitated, compared with a case where the engage member engaged with the electromagnet is directly provided on the vehicle body. Therefore, a mount facility onto the vehicle body can be improved, so that a mount process can be also diminished. Further, it is unnecessary to change rotation stopping method and component shapes of the electromagnet in each of vehicle bodies, so that increase of kind values can be prevented in an apparatus and driving force transmission axles. Therefore, amount of components can be decreased, whereby it has an advantage that component cost can become low.

According to the present invention, the first rotating member takes in the form of a bottomed and cylindrical shape, and the second rotating member is relatively rotatably connected therewith around the common axis in a state where it is received in the first rotating member. Between an inner surface of the first rotating member and an outer surface of the second rotating member, there is provided the frictional engage section to transmit a toque from one of the first and second rotating members to the other thereof. The electro-magnet is connected with a vehicle body through a non-rotating member in order to prevent its rotation with the first and second rotating members. A cover member is fitted in an opening portion of the bottomed and cylinder-shaped first rotating member outside of the electromagnet. Further, a mask member is secured to the electromagnet, inner surface of which is separated by a small distance with the second rotating member or an outer surface of the cover member. In this situation, a screw thread is formed on the outer surface of the cover member and on a portion thereof facing with an inner surface of the mask member, so as to be advanced to the mask member along a rotational direction of the common axis.

With this configuration, the electromagnet is secured to the mask member with the inner surface facing separately by a small distance with the outer surface of the cover member that is fitted into the opening portion of the bottomed cylindrical first rotating member outside of the electromagnet. On a surface facing with the inner face of the mask member at the outer surface of the cover member, there is further the screw thread that advances toward the one of the driving force transmission axles, i.e., the mask member upon the relatively rotational direction. Therefore, it can be discharged to an opening side of the mask member, i.e., to the side of one of the driving force transmission axles such alien substances that intrudes into an clearance formed between the outer surface of the cover member and the inner face of the mask member. As a result, it can be preferably prevented such incursion of alien substances into the clearance formed outside of the electromagnet, so that the durability can be sufficiently obtained in the apparatus.

Addition to the aforementioned configuration, a sealed bearing is disposed between an inner surface of the cover member and an outer surface of the electromagnet to rotatably support the electromagnet relatively with the and said second rotating members. Further, a seal member is disposed between an inner surface of the electromagnet and an outer surface of the second ring member.

As a result of addition of the sealed bearing and the seal member, in the clearances respectively formed outside of and inside of the non-rotating electromagnet, the sealed bearing seals the outer clearance outside of the electromagnet that is large in peripheral speed of the relative rotation. Accordingly, the durability can be sufficiently obtained compared with a case where the ring-shaped seal member is provided on the clearance formed outside of the electromagnet as being acceptable for the relative rotation. Further, it is unnecessary such a space in which the ring-shaped seal member is provided therein, so that the apparatus can be downsized in the axial direction and that number of the components can be decreased, resulting in being low in its cost.

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

An embodiment according to the present invention will be explained hereinafter with reference to the drawings.

Figure 1:
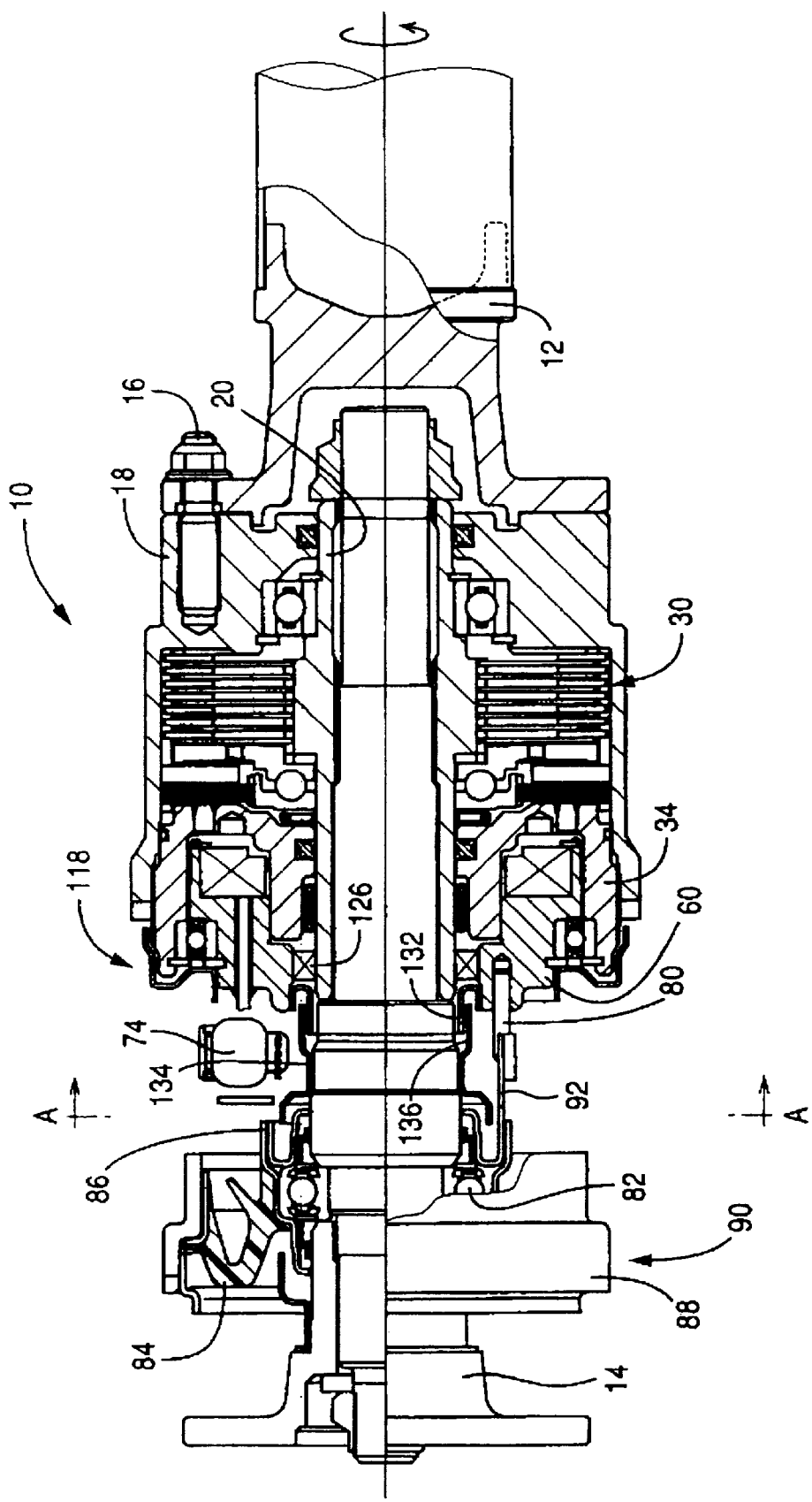
FIG. 1 is an explanatory view, partially in section and partially broken away, showing an attachment state of a driving torque transmission control apparatus used in an automotive vehicle according to an embodiment of the present invention.

FIG. 1 shows an arrangement of a driving torque transmission control apparatus 10 (referred to as "an clutch apparatus" hereinafter) according to the embodiment of the present invention for use in an automotive vehicle. In the vehicle to which the present invention is adopted, it is such a four-wheel drive vehicle wherein an engine is arranged in a front portion thereof which front wheels are basically driven by the engine therein. The clutch apparatus 10 of the embodiment is arranged between a speed reduction and rear wheels to drive them. More particularly, the clutch apparatus 10 is serially disposed between a first propeller shaft 12 and a second propeller shaft 14 so as to construct one driving torque transmission axle.

The aforementioned clutch apparatus 10 provides a first rotating member 18 that takes the form of a bottomed cylindrical shape and that rotates with the first propeller shaft 12 by being connected with an axial end portion thereof by means of a bolt-nut 16, and a second rotating member 20 that takes the form of a cylindrical shape an axial end portion of which is fitted in the second propeller shaft 14 and is spline-engaged therewith to rotate therewith. Since the second rotating member 20 is sufficiently smaller than the first rotating member 18 in diameter, the second rotating member 20 is disposed in the first rotating member 18. In such a situation, a ball bearing 22 is press-fitted between an outer surface on a top-end portion of the second rotating member 20 and an inner surface of a base-end portion of the first rotating member 18, so that the first rotating member 18 and the second rotating member 20 can be relatively rotated with each other around a common axial center. Besides, the first rotating member 18 is made of a non-magnetic alloy such a light-weight alloy to preferably form a magnetic path with an electromagnet 60 described hereafter.

Figure 2:
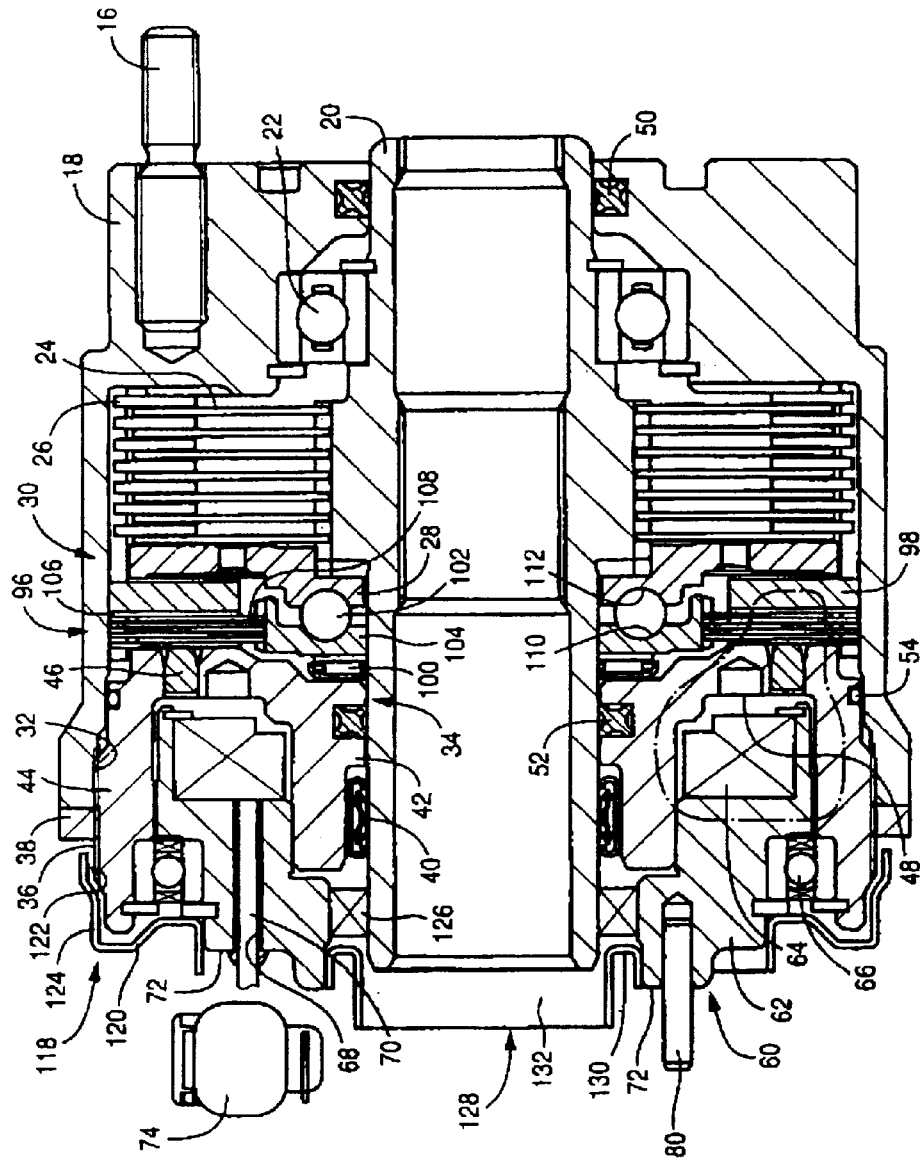
FIG. 2 is a partially enlarged and cross-sectional view of the embodiment shown in FIG. 1 and taken along with the arrows B—B in FIG. 3.

As shown in FIG. 2 in detail, a frictional engage section 30 is composed of plural disc-shaped inner frictional plates 24, plural disc-shaped outer frictional plates 26 and a main pressing member 28 which are arranged in a space defined between the outer surface of the second rotating member 20 and the inner surface of the first rotating member 18. In such a space, the plural disc-shaped inner frictional plates 24 are arranged on the outer surface of the second rotating member 20 movably in an axial direction, so as to be impossible to rotate relatively with the second rotating member 20 by being spline-engaged therewith. Similarly, the plural disc-shaped outer frictional plates 26 are further arranged on the inner surface of the first rotating member 18 movably in the axial direction, so as to be impossible to rotate relatively with the first rotating member 18 by being spline-engaged therewith. The inner frictional plates 24 and the outer frictional plates 26 are alternatively laminated in the axial direction slidably with each other, and are pressed toward a bottom portion of the first rotating member 18 by the main pressing member 28 movably provided in the axial direction. Therefore, the main frictional engage section 30 can transmit a torque proportional to a pressing force in the axial direction operated from the main pressing member 28 from the first rotating member 18 to the second rotating member 20.

On the inner surface of the bottomed and cylinder-shaped first rotating member 18, a female screw 32 is formed at an opening portion thereof, and a male screw 36 is formed on an outer surface of a cover member 34. Therefore, the cover member 34 can be threadedly engaged with the opening portion of the first rotating member 18 by threading the male screw 36 to the female screw 32. Since the first propeller shaft 12 transmits a driving force as rotating counterclockwise when the vehicle is running forward, the male screw 36 is constructed with a counterclockwise screw that is further threaded as rotating counterclockwise. A rock-nut 38 is further threaded on the male screw 36 to maintain a threaded state between the first rotating member 18 and the cover member 34. Further, the cover member 34 is rotatably supported by the second rotating member 20 through a bearing 40 fitted between its inner surface and the outer surface of the second rotating member 20 relatively with the first rotating member 18.

The cover member 34 is bodily composed of three members, i.e., an inner cover member 42 made of a magnetic metal such a silicon steel, an outer cover member 44 having the same characteristic as a silicon steel, and a press-fitting member 46 press-fitted therebetween which is made of a non-magnetic metal such a stainless steel, whereby a annular groove 48 is formed by the three members. A magnetic path shown by a one-dotted line in FIG. 2 is preferably formed by the press-fitting member 48 made of a nonmagnetic stainless steel. Since the cover member 34 is fitted between the outer surface of the second rotating member 20 and the inner surface of the first rotating member 18, the opening portion of the bottomed cylindrical-shaped first rotating member 18 is closed by the cover member 34. Accordingly, a fluid-tight space for receiving the main frictional engage section 30 and the like can be formed between the first rotating member 18 and the second rotating member 20. The main frictional engage section 30 is functioned as a wet type with lubricant oil being filled within the fluid-tight space. Besides, a seal ring 50 made of a synthetic rubber is arranged between the outer surface of the second rotating member 20 and the inner surface of the first rotating member 18 to fluid-tightly close therebetween, and a seal ring 52 made of a synthetic rubber is arranged between the outer surface of the second rotating member 20 and the inner surface of the inner cover member 42 to fluid-tightly close therebetween. Further, a seal ring 54 made of a synthetic rubber is provided between the inner surface of the first rotating member 18 and the outer surface of the outer cover member 44 to fluid-tightly close therebetween.

The electromagnet 60 is composed of a cylindrical yoke member 62 made of a magnetic metal such a silicon steel, and an annular coil 64 secured to the yoke member 62 aside of the first rotating member 18, i.e., aside of the first propeller shaft 12 so as to take the form of a cylindrical shape as a whole. In a state that the electromagnet 60 is received in the annular groove 48 formed at the end surface of the cover member 34 toward the second propeller shaft 14, it is rotatably supported through a sealed ball bearing 66 relatively with the outer cover member 44. With this configuration, the electromagnet 60 is relatively rotatable with the first rotating member 18 and the second rotating member 20 in a state that the electromagnet 60 maintains an extremely small clearance between its inner surface and outer surface with respect to a side surface of the annular groove 48. Further, a clearance between an outer surface of the yoke member 62 and the side surface of the annular groove 48 is fluid-tightly closed by the sealed needle bearing 66, so that incursion of alien substances can be prevented.

Figure 3:
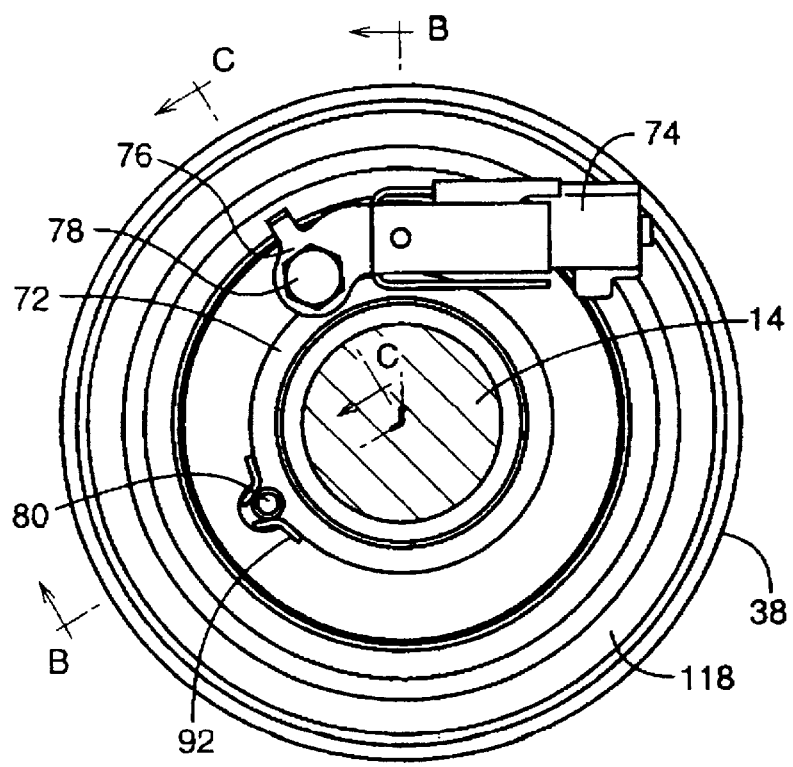
FIG. 3 is a cross-sectional view of the embodiment shown in FIG. 1 and taken along with the arrows A—A.
Figure 4:
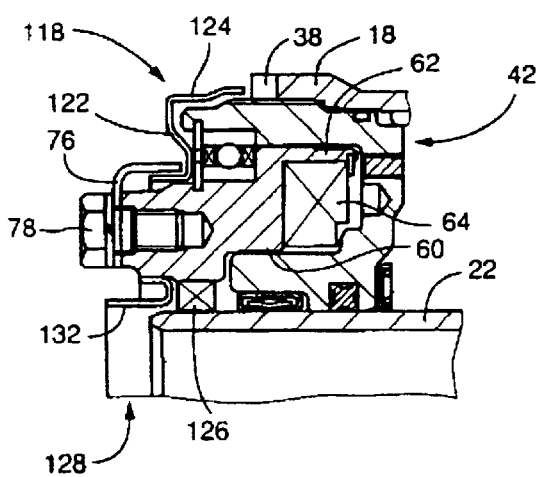
FIG. 4 is a partially enlarged and cross-sectional view of the embodiment shown in FIG. 1.

In the electromagnet 60, there is formed a penetration hole 68 through the yoke member 62 in the axial direction, through which a lead wire 70 connected with the coil 64 is carried to the outside of the clutch apparatus 10. As shown in FIGS. 3 and 4, on a bared surface of the yoke member 62 facing with the second propeller shaft 14, i.e., on a bared end-surface 72 of the electromagnet 60, there is secured a bracket 76 protruded from a connector 74 by a bolt 78 to connect the lead wire 70 with the connector 74. Further, an engage pin 80 is fixed parallel with the axial direction on the bared end-surface 72 of the electromagnet 60 by such as press-fitting manner.

Figure 5:
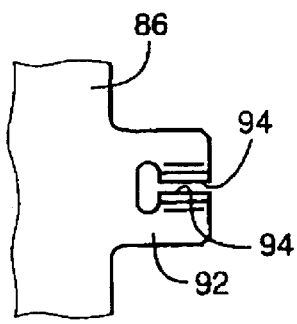
FIG. 5 is an explanatory view of an engage projection of the embodiment in FIG. 1 seen outside.

On the other hand, the second propeller shaft 14 is rotatably supported through a support bearing 82 which is secured to a non-rotating member such a vehicle body. A bearing holding apparatus 90 is fixed to the vehicle body and is composed of an elastically deformative annular absorber 84 made of such a synthetic rubber to absorb vibration, a metallic bearing holding member 86 adhesively fixed onto an inner surface of the absorber 84 to support the support bearing 82 therein, and an annular housing 88 adhesively fixed onto an outer surface of the absorber 84 to elastically support the support bearing 82 through the absorber 84. In the bearing holding member 86, there is her provided an engage projection 92 protruding toward the clutch apparatus 10 parallel with the axial direction As shown in FIG. 5, the engage projection 92 provides a pair of engage faces 94 grippingly engaging a side-surface of the engage pin 80, so that the electromagnet 60 can prevented from rotating with the clutch apparatus 10 with a certain acceptable relative movement between the engage projection 92 and the engage pin 80.

In the space between the first rotating member 18 and the second rotating member 20 fluid-tightly closed by the cover member 34, there is provided a sub-frictional engage section 96 adjacent to the cover member 34. The sub-frictional engage section 96 is further composed of a sub-pressing member 98 made of a magnetic metal which is attracted by an electromagnetic force of the electromagnet 60 to generate a relatively small pilot torque into the sub-frictional engage section 96, a thrust bearing 100, a plurality of spherical rolling members 102, and an annular rolling member 104.

The annular rolling member 104 is rotatably arranged through the thrust bearing 100 relative to the cover member 34 in a case of being bound between the main pressing member 28 and the cover member 34. The annular rolling member 104 is rotated relative to the main pressing member 28 by a relatively small rotational angle in response to the pilot torque, so that it can generate the pressing force in the axial direction toward the main frictional engage section 30.

The sub-frictional engage section 96 is composed of plural disc-shaped outer frictional plates 106 that are movably engaged in the axial direction with the inner surface of the first rotating member 18 so as not to relatively rotate with the first rotating member 18, and plural disc-shaped inner frictional engage plates 108 that are movably engaged in the axial direction with the outer surface of the annular rolling member 104 so as not to relatively rotate with the annular rolling member 104, both of which are alternatively laminated slidably with each other. In such a situation, when the electromagnet 60 is excited, the sub-frictional engage section 96 transmits to the annular rolling member 104 the pilot torque corresponding to the pressing force generated with a magnetically attractive force to act on the sub-pressing member 98. On disc-shaped surfaces of the rolling member 104 and the main-pressing member 28, there are respectively formed plural depressions 110 and 112 in a circumferential direction so as to be spaced equally, to receive a part of the plural spherical rolling member 102 between the annular rolling ember 104 and the main-pressing member 28. A depth of each of the depressions 110 and 112 is formed so as to become flat as the spherical rolling member 102 rolls in a rolling (circumferential) direction with the rolling of the annular rolling member 104, so hat the pressing force from the main-pressing member 28 to the main frictional engage section 30 becomes large in correspondence with a rolling amount of the annular rolling ember 104. With this operation, the torque corresponding to an exciting current of the electro-magnet 60 can be transmitted from one of the first and second rotating members 18 and 20 to the other thereof In this embodiment, since the driving force output from the engine and the transmission is transmitted to the second propeller shaft 14 with the counterclockwise rotation of the first propeller shaft 12, the first rotating member 18 is counterclockwise rotated relative to the second rotating member 20. At that time, the spherical rolling member 102 is rolled clockwise relative to the annular rolling member 104 and counterclockwise relative to the main-pressing member 28 when the annular rotating member 104 is rotated counterclockwise relative to the second rotating member 20 upon generation of the pilot torque or increase thereof. Therefore, the depth of the depression 110 becomes flat along with an opposite direction to the rotational direction of the first propeller shaft 12, i.e., the first rotating member 18. Further, the depth of the depression 112 becomes flat along with the rotational direction of the first propeller shaft 12.

In the above-mentioned clutch apparatus 10, since the outer cover member 44, the yoke member 62 and the second rotating member 20 are relatively rotated with each other, there are formed a pair of annular clearances at an opening side of the bottomed cylindrical first rotating member 18, i.e., aside of the second propeller shaft 14, which clearances are respectively provided between the outer cover member 44 and the yoke member 62 (electromagnet 60) and between the yoke member 62 and the second rotating member 20. An outer clearance defined between the outer cover member 44 and the yoke member 62 is not only fluidly closed by the sealed bearing 66 as described above, but also cover by an annular mask plate 118 made of a metallic material and fitted onto the yoke member 62 to prevent incursion of alien substances such a dust. The outer mask plate 118 includes a bottom wall 120 outwardly extending from the yoke member 62, an inner face 122 facing with the outer surface of the cover member 34 with an extremely small clearance and an outer wall 124 extending in the axial direction from an edge portion of the bottom wall 120 toward the first rotating member 18. On the outer surface of the cover member 34, i.e., at a portion facing with the inner surface 122 of the outer wall 124, there is positioned an extending portion of the male screw 36 to threadedly engage with the inner surface of the first rotating member 18. Since the first rotating member 18 is relatively rotated counterclockwise to the outer wall 124 when the vehicle travels forward, it can be so constructed to obtain an discharge effect of alien substances by a screw thread of the male screw 36 that is a counterclockwise screw.

Next, into an inner clearance defined between the yoke member 62 and the second rotating member 20, there is fitted a seal member 126 similarly constructed to a wellknown oil seal. Further, the inner clearance is covered by a cylindrical inner mask member 128 which is made of a metallic material and press-fitted into the yoke member 62 to prevent incursion of alien substances. The inner mask member 128 is constructed with a bottom wall 130 covering the inner clearance, and an inner wall 132 extending in the axial direction from an inner edge of the bottom wall 130 toward the second propeller shaft 14. On the outer surface of the propeller shaft 14, i.e., at a portion between the bearing holding apparatus 90 and the second rotating member 20, there is press-fitted a shaft-side mask member 134. Aside of the clutch apparatus 10, the shaft-side mask member 134 provides a large-diameter end portion 136 positioned outside of the inner wall 132 and laminated in a radial direction therewith, that constructs a labyrinth seal to improve a seal ability by covering the inner clearance.

In the clutch apparatus 10 as constructed above, since the electromagnet 60 is engaged with the engage projection (engage member) 92 provided on the bearing holding member 86 of the bearing holding apparatus 90 to prevent its rotation of the electromagnet 60, mechanical vibrations from the vehicle body is passed through the absorber 84 to the engage projection 92 and the electro-magnet 60. However, the mechanical vibration from the vehicle body to the electro-magnet 60 and/or the clutch apparatus 10 can be sufficiently restrained by the absorber 84, so that a durability of the clutch apparatus 10 can be improved and it can be restrained such noise and vibrations through the vehicle body to a passenger cabin generated when the electromagnet 60 is contacted with a peripheral connection mechanism.

According to this embodiment, an assemble of the first and second propeller shafts 12 and 14 (driving force transmission axle) to the vehicle body can be facilitated, compared with a case where the engage projection (engage member) 92 engaged with the electromagnet 60 is directly provided on the vehicle body. Therefore, a mount facility onto the vehicle body can be improved, so that a mount process can be also diminished. Further, it is unnecessary to change rotation stopping method and component shapes of the electromagnet 60 in each of vehicle bodies, so that increase of a number of kind can be prevented in a driving torque transmission control apparatus and a driving force transmission axle. Therefore, amount of components can be decreased, whereby it has an advantage that component cost can become low In this embodiment, the electromagnet 60 is secured to the outer mask plate 118 with the inner face 122 facing separately by a small distance with the outer surface of the cover member 34 that is fitted into the opening portion of the bottomed cylindrical first rotating member 18 outside of the electromagnet 60. On a surface facing with the inner face of the outer mask plate 1 18 at the outer surface of the cover member 34, there is further the screw thread that advances toward the second propeller shaft 14, i.e., the outer mask plate 118 upon the relatively rotational direction. Namely, when the first and second propeller shafts 12 and 14 are counterclockwise rotated in an advancing operation of the vehicle, the male screw 36 is also formed so as to be counterclockwise. With this configuration, it can be discharged to an opening side of the outer mask plate 118, i.e., to the side of the first propeller shaft 12 such alien substances that intrudes into the clearance formed between the outer surface of the cover member 34 and the inner face 122 of the outer mask plate 118. Therefore, it can be preferably prevented such incursion of alien substances into the clearance formed outside of the electromagnet 60, so that the durability can be sufficiently obtained in the clutch apparatus.

As mentioned above, the electromagnet 60 is relatively rotatably supported in a state that the cover member 34 is fitted into the opening portion of the bottomed and cylinder-shaped first rotating member 18 outside of the electromagnet 60. In such a situation, the sealed ball bearing 66 is disposed between the inner surface of the cover member 34 and the outer surface of the electro magnet 60, and the seal member 126 is also disposed between the inner surface of the electromagnet 60 and the outer surface of the second rotating member 20. In the clearances respectively formed outside of and inside of the non-rotating electromagnet 60, the sealed ball bearing 66 seals the outer clearance outside of the electromagnet 60 that is large in peripheral speed of the relative rotation. Accordingly, the durability can be sufficiently obtained compared with a case where the ring-shaped seal member is provided on the clearance formed outside of the electromagnet 60 as being acceptable for the relative rotation. Further, it is unnecessary such a space in which the ring-shaped seal member is provided therein, so that the clutch apparatus 10 can be downsized in the axial direction and that number of the components can be decreased, resulting in being low in its cost.

According to his embodiment, the annular electromagnet 60 is composed of the cylindrical yoke member 62 and the annular coil 62 fixed thereto aside of the first rotating member 18. In this construction, the engage projection (engage member) 92 is engaged with the side surface of the engage pin 80 that is provided parallel with the axial direction on the bared end-surface 72 of the yoke member 62 bared at the opening portion of the first rotating member 18. Therefore, it has an advantage that the relative movement of the engage pin 80 to the engage projection 92 supported on the absorber 84 can be accepted in the axial direction.

Further, the penetration hole 68 penetrating in the axial direction is provided in the yoke member 62, through which the lead wire 70 is connected with the annular coil 64 secured to the yoke member 62 aside of the first rotating member 18 to supply the exciting current thereto. With this configuration, aspenty on the inner or outer surface of the yoke member 64 can be reduced as compared with a case where the lead wire 70 is passed through a groove formed on the inner or outer surface of the yoke member 64, so that it can be improved such a seal ability to prevent from incursion of alien substances.

Further according to this embodiment, since the lead wire 70 through the penetration hole 68 is connected with the connector 74 that is secured onto the bared end-surface 72 of the yoke member bared at the opening portion of the first rotating member 18, the connector 74 can be formed at a portion close to the yoke member 62. Therefore, a liability against a break of the lead wire 70 and the like can be improved, and it can be also enjoyed such that the construction is facilitated.

Moreover, there is provided the male screw 36 at the outer surface of the cover member 34, with which the inner surface of the bottomed cylindrical first rotating member is threadedly engaged. The outer mask plate 118 provides the bottom wall 120 and the cylindrical outer wall 124 extending in the axial direction from the outer edge portion of the bottom wall 124 to which the bared end-surface 72 of the yoke member 62 is secured at the opening portion of the first rotating member 18. At a portion facing with the outer wall 124 on the outer surface of the cover member 34, there is formed screw thread that is extension of the male screw 36. Since the extended portion of the male screw 36 for engagement of the cover member 34 with the inner surface of the first rotating member 18 is positioned at a portion facing with the outer wall 124 of the outer mask plate 118, it can be obtained to prevent from incursion of alien substances, whereby it is unnecessary to independently machine the screw thread.

In this embodiment, in the clearance between the inner surface of the electromagnet 60 and the outer surface of the second rotating member 20 in which the seal member 126 is disposed, the outer surface of the second rotating member 20 is of a surface by which the needle bearing 40 supporting the cover member 34 is supported. Since such a surface is subjectively performed by a grinding finishing machining operation and by a heat treatment, it is unnecessary to especially perform such processes for the seal member 126.

In accordance with this embodiment, the end surface of the inner cover member 42 is positioned over the bared end-surface 72 of the yoke member 62 or the end surface of the outer cover member 44 toward the first propeller shark 12. Further, the yoke member 62 is so formed to cover the end surface of the inner cover member 42, and the outer surface of the second rotating member 20 is positioned at an inner surface close to the bared end-surface 72 of the yoke member 62. With this construction, it is an advantage such that the clearance between the inner surface of the electromagnet 60 and the outer surface of the second rotating member 20 can be closed by only one of the seal member 126.

Next, modifications according to the present invention will be explained hereafter with reference to drawings. Besides, in the explanation described below, a common portion to the aforementioned embodiment is suffixed to the same numeral therewith to omit its explanation.

Figure 6:
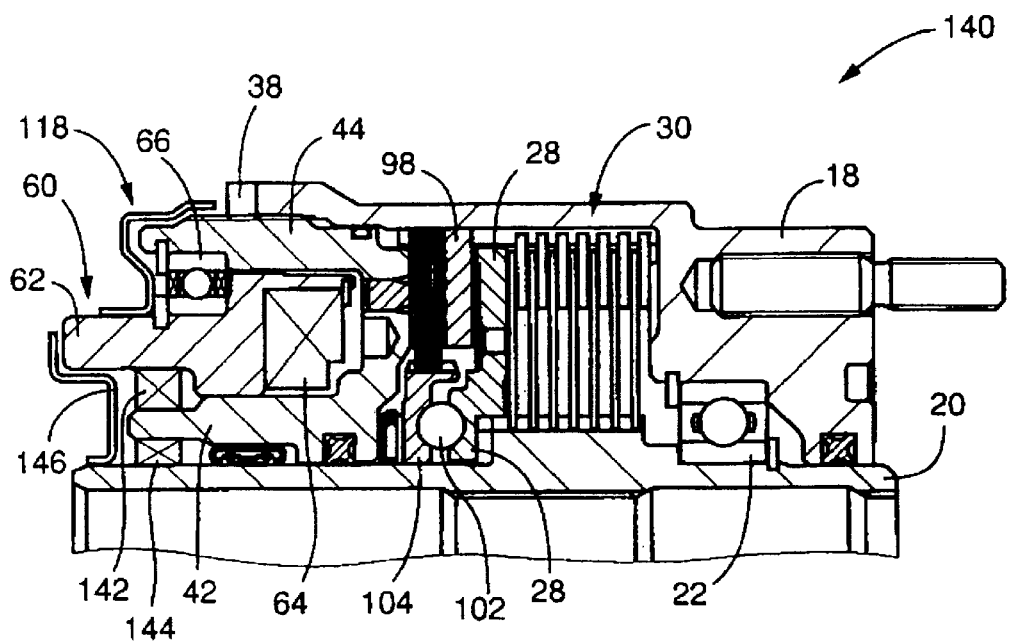
FIG. 6 is a partially enlarged and cross-sectional view for an explanation of another embodiment according to the present invention.

In a clutch apparatus 140 shown in FIG. 6, an end surface of the inner cover member 42 coincides with an end surface of the outer cover member 44 in position in the axial direction, as compared with the aforementioned embodiment shown in FIGS. 1–5. In such a situation, the bared end-surface 72 of the yoke member 62 is positioned over the end surface of the inner cover member 42 toward the second propeller shaft 14. At the opening side of the first rotating member 18, there is provided a first seal member 142 to seal a clearance defined between an inner surface of the yoke member 62 and an outer surface of the inner cover member 42 therein. Further, there is provided a second seal member 144 to seal a clearance defined between an inner surface of the inner cover member 42 and an outer surface of the second rotating member 20 therein. These clearances are commonly covered by an inner mask member 146 engaged with an axial end portion of the second rotating member 20. Thus, the aforementioned constructions are different from that of the embodiment shown in FIGS. 1–5 and however, the other constructions including the rotation stopping mechanism of the electromagnet 60 are configured similar to that therein.

Figure 7:
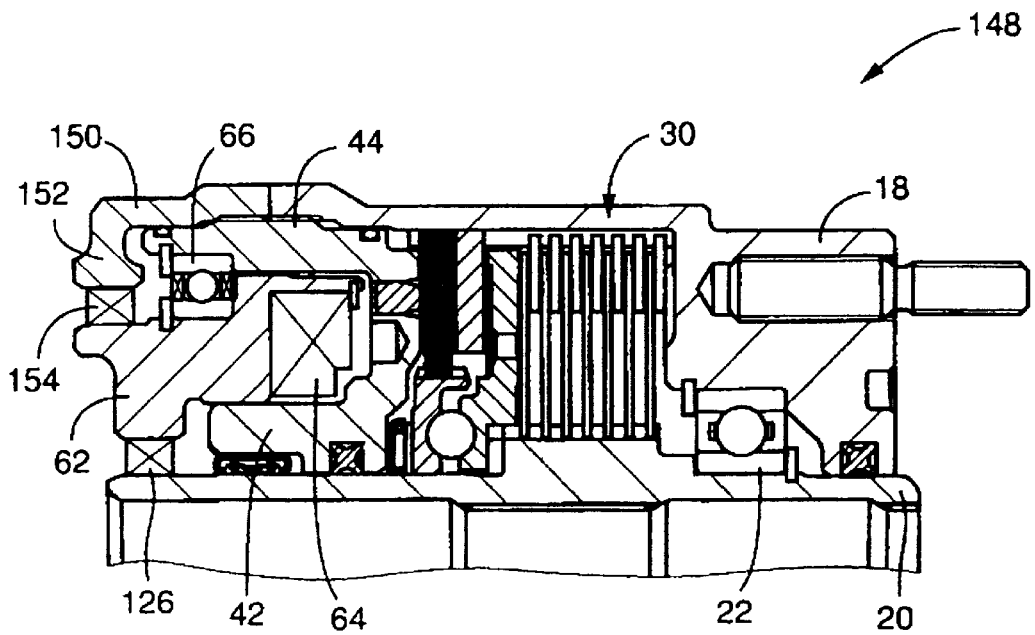
FIG. 7 is a partially enlarged and cross-sectional view for an explanation of the other embodiment according to the present invention.

A clutch apparatus 148 shown in FIG. 7 is different from the aforementioned embodiment shown in FIGS. 1–5 in that a second cover member 150 having a cylindrical shape is threadedly engaged with the male screw formed on the outer surface of the cover member 34 instead of the outer mask member 118 and the lock-nut 38. At an end portion of the second cover member 150 aside of the second propeller shaft 14, there is formed an inward flange 1 52 protruding inwardly so as to cover an outer clearance provided between the inner surface of the cover member 34 and the outer surface of the electro-magnet 60. A seal member 154 is disposed between the inward flange 152 and the outer surface of the electromagnet 60. In such a situation, since the outer clearance defined provided between the inner surface of the cover member 34 and the outer surface of the electromagnet 60 is double-covered by the seal member 154 and the sealed ball bearing 66, it may be used such a general ball bearing instead of the sealed ball bearing 66.

Figure 8:
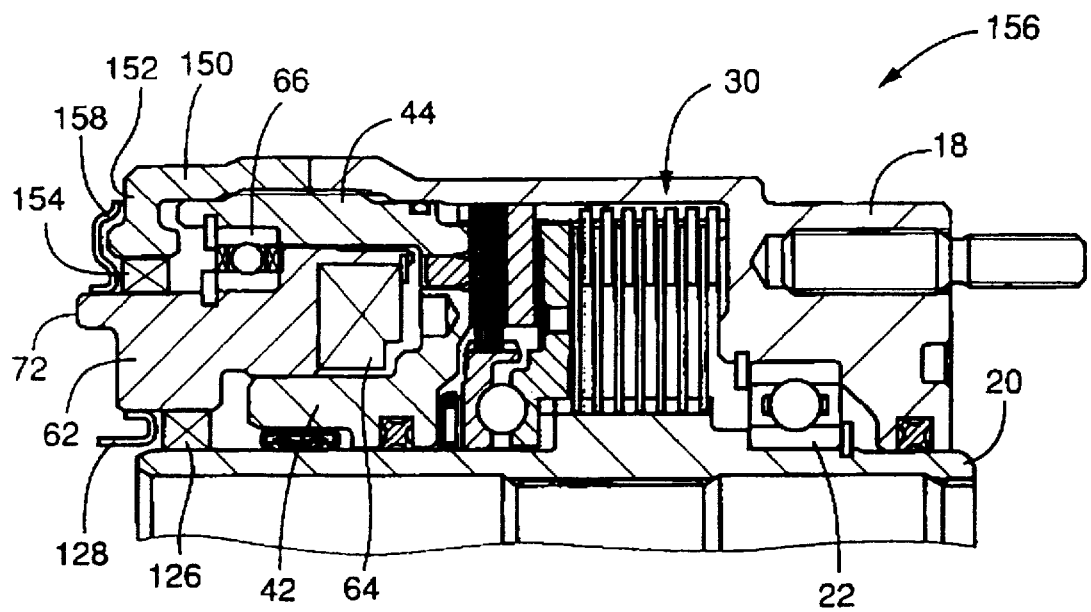
FIG. 8 is a partially enlarged and cross-sectional view for an explanation of the other embodiment according to the present invention.

As compared with the clutch apparatus 148 shown in FIG. 7, the following construction is different from that of a clutch apparatus 156 shown in FIG. 8. Namely, the bared end-surface 72 of the yoke member 62 is further extended toward the second propeller shaft 14. At the extended portion 72, there is fitted a mask member 158 to cover the seal member 154.

Figure 9:
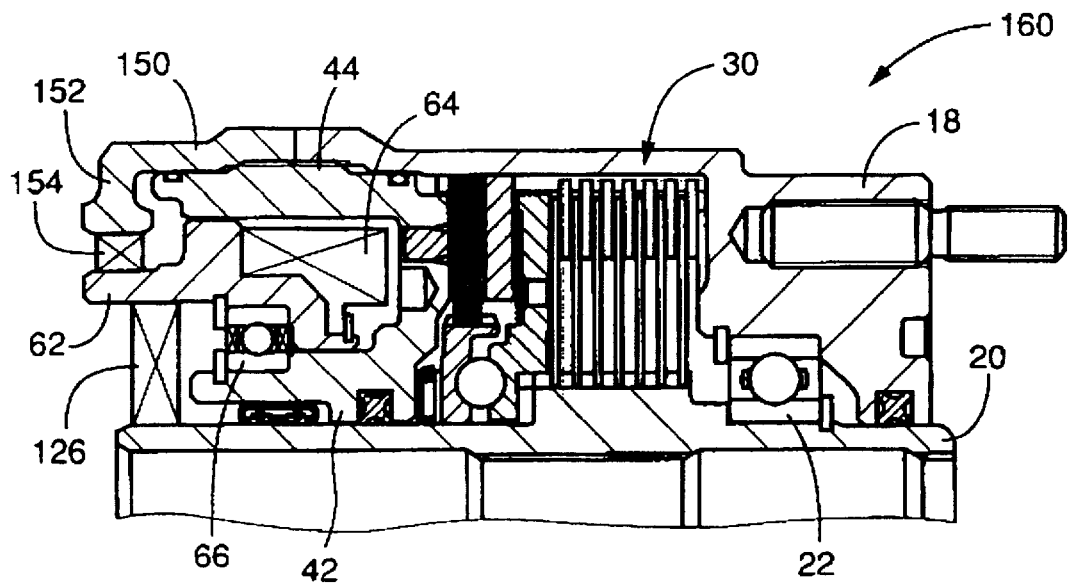
FIG. 9 is a partially enlarged and cross-sectional view for an explanation of the other embodiment according to the present invention.

In a clutch apparatus 160 shown in FIG. 9, the following constructions are different from that of the aforementioned clutch apparatus 148 shown in FIG. 7. The coil 64 of the electromagnet 60 is fixed onto an outer surface at an end portion of the yoke member 62 aside of the first propeller shaft 12. Further, the sealed ball bearing 66 is positioned between the outer surface of the inner cover member 42 and the inner surface of the yoke member 62. In this embodiment, the sealed ball bearing 66 can be diminished in its diameter, so that it has advantages that the cost thereof can be decreased and that the durability thereof can be increased.

Figure 10:
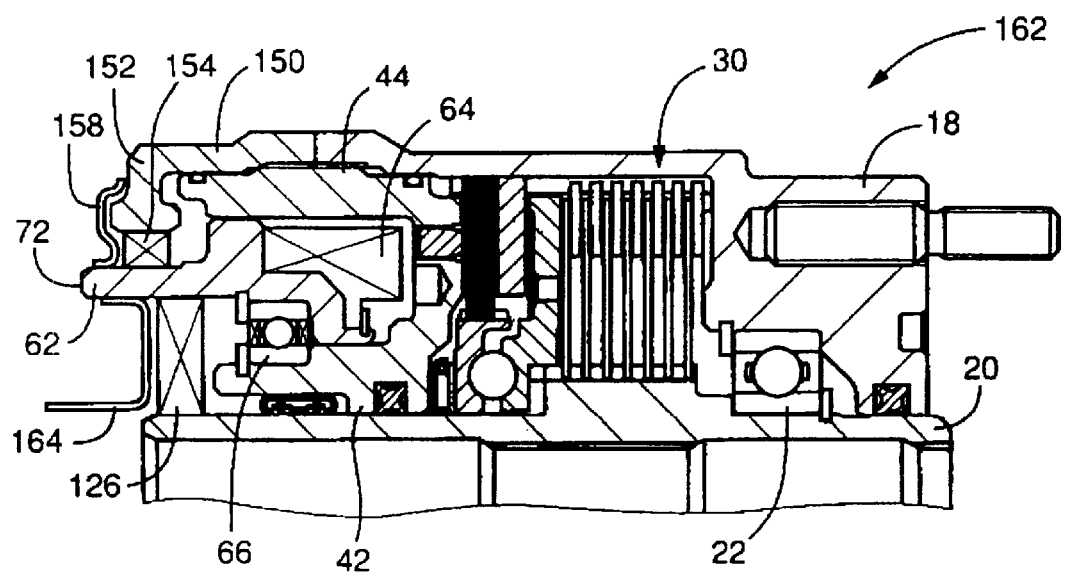
FIG. 10 is a partially enlarged and cross-sectional view for an explanation of the other embodiment according to the present invention.

A clutch apparatus 162 shown in FIG. 10 is different from the aforementioned clutch apparatus 160 shown in FIG. 9 in that the bared end-surface 72 of the yoke member 62 is further extended toward the second propeller shaft 14 and in that a mask member 164 and the mask member 154 are respectively fitted in the extended portion of the bared end-surface 72 to cover the seal members 126 and 154.

Figure 11:
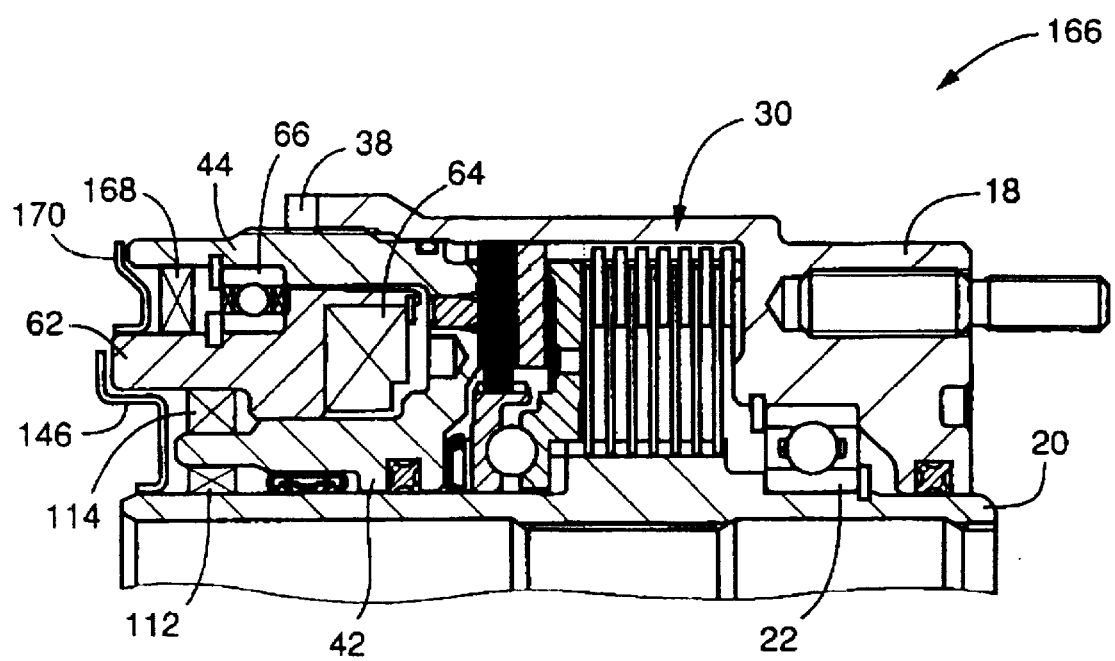
FIG. 11 is a partially enlarged and cross-sectional view for an explanation of the other embodiment according to the present invention.

A clutch apparatus 166 shown in FIG. 11 is different from the aforementioned clutch apparatus 140 shown in FIG. 6 in that an end surface of the outer cover member 44 is further extended toward the second propeller shaft 14 in which a seal member 168 is provided between an inner surface of the extended portion and the outer surface of the yoke member 62. Further, a mask member 170 is fitted on the outer surface of the yoke member 62 to cover the seal member 168.

Figure 12:
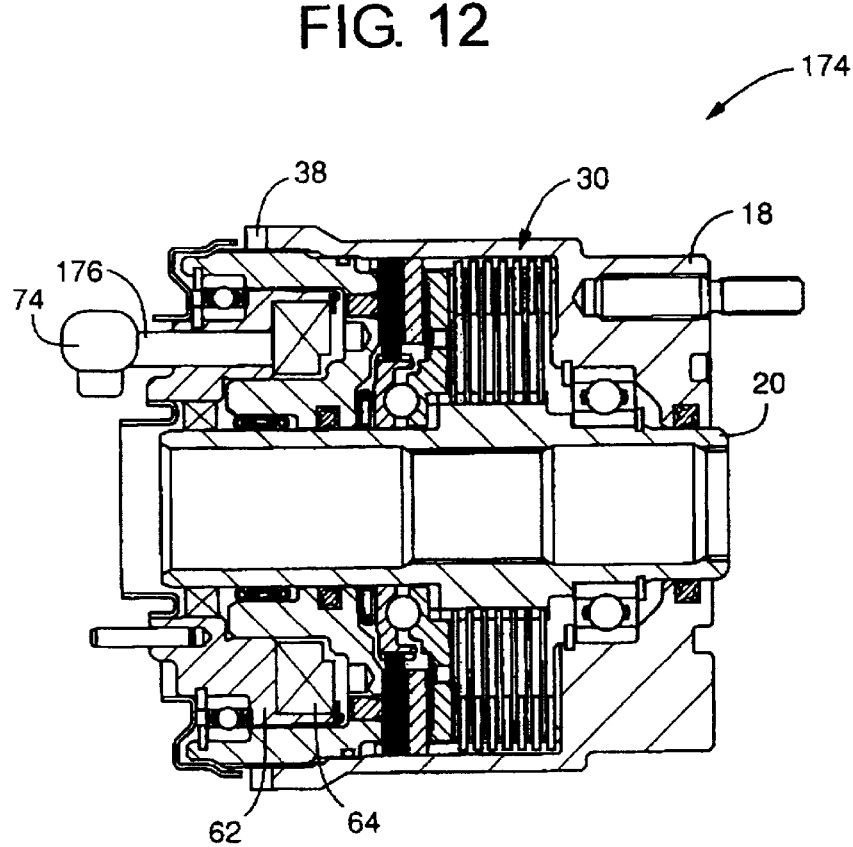
FIG. 12 is a partially enlarged and cross-sectional view for an explanation of the other embodiment according to the present invention.
Figure 13:
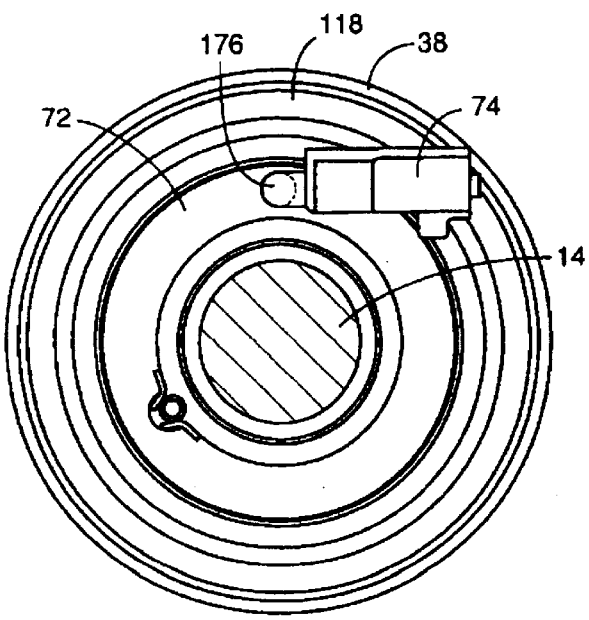
FIG. 13 is a cross-sectional view of the other embodiment shown in FIG. 12, in correspondence with FIG. 3.

As compared with the aforementioned embodiment shown in FIGS. 1–5, it is different from that of a clutch apparatus 174 shown in FIGS. 12 and 13 such that the connector 74 and an arm 176 are uniformly formed with mold plastic through which arm the lead wire 76 is penetrated from the coil 64 to the connector 74, instead of the bracket 76 supporting the connector 74.

Further, in the aforementioned embodiment, the engage projection 92 protruded from the bearing holding member 86 is engaged with the engage pin 80 provided on the based end-surface 72 of the yoke member 62, so that the electromagnet 60 can be prevented from rotating with the other portion (the clutch apparatus 10). However, a top portion of the engage projection 92 may be inserted into an engage hole formed on the bared end-surface 72 of the yoke member 62 to stop rotating of the electromagnet 60 with the other portions.

As described above, the engage projection 92 protruded from the bearing holding member 92 is functioned as an engage member. Instead of that, it may be used as an engage member such a member that is protruded from an outer surface of the support bearing 82 supported by the bearing holding member 86.

Obviously, numerous modifications and variations of the present invention are possible in light of the above teachings. It is therefore to be understood that within the scope of the appended claims, the present invention may be practiced otherwise than as specifically described herein.

What is claimed is:

1. A driving torque transmission control apparatus that is rotatably supported onto a vehicle body through a support bearing supported by a bearing holding device including an absorber and a bearing holding member, and that is serially disposed between driving force transmission axles to electromagnetically control a driving torque transmitted from one of the driving force transmission axles to the other thereof, said apparatus comprising:

a first rotating member and a second rotating member rotatably connected around a common axis to the driving force transmission axles relatively with each other;

a frictional engage section provided between said first rotating member and said second rotating member, said frictional engage section is configured to transmit from one of said first rotating member and said second rotating member to the other thereof;

an annular electromagnet provided around the common axis between said first rotating member and said second rotating member, said electromagnet is configured to control a transmission torque of said frictional engage section; and an engage member provided on the support bearing that is supported by the bearing holding member of the bearing holding device or the bearing holding device itself, said engage member is configured to be engaged with said electromagnet to prevent rotation of said electromagnet with said first rotating member and said second rotating member.

2. A driving torque transmission control apparatus that is serially disposed between driving force transmission axles to electro-magnetically control a driving torque transmitted from one of the driving force transmission axles to the other thereof, said apparatus comprising:

a bottomed cylindrical first rotating member provided between the driving force transmission axles and rotatable around a common axis thereto;

a second rotating member that is relatively rotatably connected around the axis with said first rotating member in a state where said second rotating member is received in said first rotating member;

a frictional engage section provided between an inner surface of said first rotating member and an outer surface of said second rotating member to transmit a toque from one of said first rotating member and said second rotating member to the other thereof;

an annular electro-magnet received in said first rotating member to control a transmission torque of said frictional engage section, said electromagnet is configured to be relatively rotatable with said first rotating member and said second rotating member around the common axis, and to connected with a vehicle body through a non-rotating member in order to prevent its rotation with said first rotating member and said second rotating member;

a cover member fitted in an opening portion of said bottomed and cylinder-shaped first rotating member outside of said electromagnet;

a mask member secured to said electromagnet, inner surface of which is separated by a small distance with said second rotating member or an outer surface of said cover member; and a screw thread formed on the outer surface of said cover member and on a portion thereof facing with an inner surface of said mask member, said screw thread is configured to be advanced to said mask member along a rotational direction of the common axis.

3. A driving torque transmission control apparatus that is serially disposed between driving force transmission axles to electromagnetically control a driving torque transmitted from one of the driving force transmission axles to the other thereof, said apparatus comprising:

a bottomed and cylinder-shaped first rotating member provided between the driving force transmission axles and rotatable around a common axis thereto;

a second rotating member that is rotatably connected around the axis relatively said first rotating member in a state where said second rotating member is received in said second rotating member;

frictional engage section provided between an inner surface of said first rotating member and an outer surface of said second rotating member to transmit a toque from one of said first rotating member and said second rotating member to the other thereof;

an annular electro-magnet received in said first rotating member to control a transmission torque of said frictional engage section, said electromagnet is configured to be relatively rotatable with said first rotating member and said second rotating member around the common axis, and to connected with a vehicle body through a non-rotating member in order to prevent its rotation with said first rotating member and said second rotating member;

a cover member fitted in an opening portion of said bottomed cylindrical first rotating member outside of said electro-magnet;

a sealed bearing disposed between an inner surface of said cover member and an outer surface of said electromagnet to rotatably support said electromagnet relatively with said first rotating member and said second rotating member; and a seal member disposed between an inner surface of said electromagnet and an outer surface of said second rotating member.

* * * * *

UNITED STATES PATENT AND TRADEMARK OFFICE
CERTIFICATE OF CORRECTION

PATENT NO.  : 6,206,159 B1　　　　　　　　　　　　　　　　　　　　　　Page 1 of 1
DATED       : March 27, 2001
INVENTOR(S) : Takuno et al.

It is certified that error appears in the above-identified patent and that said Letters Patent is hereby corrected as shown below:

Title page,
Item [30], the Foreign Application Priority Data should read as follows:

-- [30]　　　Foreign Application Priority Data
　　Nov. 20, 1998　　(JP) ................................. 10-330780 --

Signed and Sealed this

Twenty-fifth Day of December, 2001

Attest:

Attesting Officer

JAMES E. ROGAN
*Director of the United States Patent and Trademark Office*